(12) United States Patent
Komuro et al.

(10) Patent No.: US 10,073,010 B2
(45) Date of Patent: Sep. 11, 2018

(54) TORQUE STEERING ANGLE SENSOR AND METHOD FOR CORRECTING THE SAME

(71) Applicant: Hitachi Metals, Ltd., Tokyo (JP)

(72) Inventors: Takanori Komuro, Hitachi (JP); Teruyuki Nakamura, Hitachi (JP); Yukio Ikeda, Hitachi (JP)

(73) Assignee: Hitachi Metals, Ltd., Tokyo (JP)

( * ) Notice: Subject to any disclaimer, the term of this patent is extended or adjusted under 35 U.S.C. 154(b) by 86 days.

(21) Appl. No.: 15/266,432

(22) Filed: Sep. 15, 2016

(65) Prior Publication Data

US 2017/0108411 A1 Apr. 20, 2017

(30) Foreign Application Priority Data

Oct. 14, 2015 (JP) ................. 2015-202994

(51) Int. Cl.
| | | |
|---|---|---|
| *G01M 17/06* | (2006.01) | |
| *G01L 3/10* | (2006.01) | |
| *G01L 5/22* | (2006.01) | |
| *G01D 5/14* | (2006.01) | |
| *G01D 5/12* | (2006.01) | |
| *G01D 5/20* | (2006.01) | |
| *G01D 5/244* | (2006.01) | |
| *B60W 30/02* | (2012.01) | |
| *G01P 3/44* | (2006.01) | |
| *G01R 33/09* | (2006.01) | |
| *G01R 33/04* | (2006.01) | |
| *G01N 27/72* | (2006.01) | |

(52) U.S. Cl.
CPC ............ *G01M 17/06* (2013.01); *B60W 30/02* (2013.01); *G01D 5/14* (2013.01); *G01L 3/101* (2013.01); *B60W 2510/202* (2013.01)

(58) Field of Classification Search
CPC ........ G01M 17/06; G01L 3/101; G01L 3/102; G01L 3/104; G01L 5/221; B60W 30/02; B60W 2510/202; G01D 5/14; G01D 5/142; G01D 5/145; G01D 5/12; G01D 5/20; G01D 5/147; G01D 5/24471; G01N 27/72;
(Continued)

(56) References Cited

U.S. PATENT DOCUMENTS 6,810,754 B2 * 11/2004 May ..................... G01D 5/14
  73/862.333
7,583,080 B2 * 9/2009 Uehira ............... B62D 15/0215
  324/207.12

(Continued)

FOREIGN PATENT DOCUMENTS

JP 2014-66561 A 4/2014

*Primary Examiner* — Daniel S Larkin
*Assistant Examiner* — Anthony W Megna Fuentes
(74) *Attorney, Agent, or Firm* — Roberts, Mlotkowski, Safran, Cole & Calderon, P.C.

(57) ABSTRACT

A torque steering angle sensor includes a ring magnet that rotates together with the first rotary member, a second magnetic field detecting element arranged opposite an outer peripheral surface of the ring magnet, a slide magnet arranged opposite the second magnetic field detecting element in the axial direction, and a slide mechanism moving the slide magnet in the axial direction depending on a rotation of the first rotary member; and wherein the steering angle computing portion includes a slide magnet distance computing portion calculating a migration length from a reference position of the slide magnet; and a steering angle correcting portion correcting an offset of the magnetic field strength in the radial direction based on the migration length and configures so as to compute the steering angle of the steering wheel using a magnetic field strength in the radial direction corrected by the steering angle correcting portion.

12 Claims, 9 Drawing Sheets

(58) Field of Classification Search
CPC . G01P 3/443; G01P 3/44; G01P 1/026; G01R 33/09; G01R 33/07; G01R 33/077
USPC ..... 73/117.02, 862.331–862.335; 324/207.2, 324/207.21, 207.25, 174
See application file for complete search history.

(56) References Cited

U.S. PATENT DOCUMENTS

| | | | | |
|---|---|---|---|---|
| 8,087,305 | B2* | 1/2012 | Eggimann | G01L 3/104 73/862.333 |
| 8,607,650 | B2* | 12/2013 | Antoni | G01D 5/2451 73/760 |
| 2005/0253578 | A1* | 11/2005 | Kawashima | G01D 5/145 324/207.25 |
| 2010/0242627 | A1* | 9/2010 | Okuyama | G01D 1/00 73/862.335 |
| 2011/0126639 | A1* | 6/2011 | Behrens | G01L 3/104 73/862.193 |
| 2011/0303001 | A1* | 12/2011 | Hirose | G01L 5/221 73/117.02 |
| 2013/0152702 | A1* | 6/2013 | Takahashi | G01L 3/101 73/862.331 |
| 2015/0114139 | A1* | 4/2015 | Kataoka | B62D 6/10 73/862.333 |
| 2015/0362388 | A1* | 12/2015 | Schmid | G01L 3/109 73/862.333 |

* cited by examiner

TORQUE STEERING ANGLE SENSOR AND METHOD FOR CORRECTING THE SAME

The present application is based on Japanese patent application No. 2015-202994 filed on Oct. 14, 2015, the entire contents of which are incorporated herein by reference.

BACKGROUND OF THE INVENTION

1. Field of the Invention

This invention relates to a torque steering angle sensor that can detect a steering torque and a steering angle of a steering wheel of a vehicle and a method for correcting the same.

2. Description of the Related Art

Conventionally, electric power assisted steering device for vehicles is provided with a torque sensor which can detect a steering torque. Such a torque sensor can detect a steering angle as well as the steering torque (See e.g. JP-A-2014-66561).

The torque steering angle sensor is configured so as to detect a steering torque by detecting a torsional angle of a torsion bar coupling an input shaft and an output shaft of a steering shaft. For example, the torsional angle of the torsion bar, that is a steering torque can be detected by arranging a circular ring magnet that is provided with a plurality of different magnetic poles having different polarities in a circumferential direction around an input shaft and magnetic path forming members that are configured so as to vary a relative angle between a ring magnet depending on the twist of the torsion bar and vary a transmitting magnetic flux by varying a positional relation with the magnetic poles depending on a variation of the relative angle. The magnetic path forming members are made of, for example, a magnetic material such as permalloy material.

On the other hand, a steering angle can be detected by detecting a rotational angle of the input shaft and the output shaft. For example, a magnetic field detecting element is arranged opposite the ring magnet of the input shaft. The present applicant proposes that to detect a number of a rotation of the ring magnet by arranging a slide magnet that varies a length between a magnet field detecting element for detecting a steering angle depending on a rotation of a ring magnet and detecting a magnetic field variety from the slide magnet.

SUMMARY OF THE INVENTION

If the torque steering angle sensor is constructed by plural magnetic field detecting elements, plural magnets, and single or plural magnetic materials (e.g., permalloy materials) as described above, the respective parts of the steering torque measuring mechanism and the steering angle measuring mechanism affect each other, so that a measurement error may be more than that in the case that the measuring mechanisms are used separately.

It is an object of the invention to provide a torque steering angle sensor that has an enhanced detection accuracy, as well as a method for correcting the torque steering angle sensor.

According to an embodiment of the invention, provided is a torque steering angle sensor, which is arranged at a coupling portion between a first rotary member and a second rotary member coupled by a torsion bar generating a torsional angle according to a steering torque of a steering wheel so as to detect a steering angle and a steering torque of the steering wheel, comprising:

a circular ring magnet that a plurality of different magnetic poles having different polarities are formed along a circumferential direction around a rotational axis line of the first rotary member and the second rotary member, and that is rotated together with the first rotary member;

a plurality of magnetic path forming members that are arranged so as to be rotated together with the second rotary member, and that are configured so as to allow a relative angle to the ring magnet to vary according to a torsion of the torsion bar and allow a transmitted magnetic flux to vary along with a change in a positional relation with the magnetic poles according to the varied relative angle;

a pair of magnetic flux collecting rings that collect a magnetic flux in the plurality of magnetic path forming members;

a first magnetic field detecting element that is adapted to detect a magnetic field strength between the pair of the magnetic flux collecting rings;

a steering torque computing portion that computes the steering torque of the steering wheel based on the magnetic field strength detected by the first magnetic field detecting element;

a second magnetic field detecting element that is arranged on a non-rotary member, which is not rotated upon rotation of the first rotary member, opposite an outer peripheral surface of the ring magnet and that is adapted to detect a magnetic field strength in three directions including a radial direction of the ring magnet, an axial direction linear to the rotational axis, and a tangential direction vertical to the radial direction and the axial direction;

a slide magnet that is arranged opposite the second magnetic field detecting element in the axial direction;

a slide mechanism that moves the slide magnet in the axial direction according to a rotation of the first rotary member; and a steering angle computing portion that computes a steering angle of the steering wheel based on the magnetic field strength in the three directions detected by the second magnetic field detecting element, wherein the steering angle computing portion comprises a slide magnet distance computing portion that calculates a migration length from a reference position of the slide magnet based on the magnetic field strength in the axial direction detected by the second magnetic field detecting element, and a steering angle correcting portion that corrects an offset of the magnetic field strength in the radial direction based on the migration length of the slide magnet calculated by the slide magnet distance computing portion, and wherein the steering angle computing portion computes the steering angle of the steering wheel using the magnetic field strength in the radial direction corrected by the steering angle correcting portion.

According to another embodiment of the invention, provided is a method for correcting a torque steering angle sensor, wherein the torque steering angle sensor is arranged at a coupling portion between a first rotary member and a second rotary member coupled by a torsion bar generating a torsional angle according to a steering torque of a steering wheel so as to detect a steering angle and a steering torque of the steering wheel, and wherein the torque steering angle sensor comprises:

a circular ring magnet that a plurality of different magnetic poles having different polarities are formed along a circumferential direction around a rotational axis line of the first rotary member and the second rotary member, and that is rotated together with the first rotary member;

a plurality of magnetic path forming members that are arranged so as to be rotated together with the second rotary member, and that are configured so as to allow a relative angle to the ring magnet to vary according to a torsion of the torsion bar and allow a transmitted magnetic flux to vary along with a change in a positional relation with the magnetic poles according to the varied relative angle;

a pair of magnetic flux collecting rings that collect a magnetic flux in the plurality of magnetic path forming members;

a first magnetic field detecting element that is adapted to detect a magnetic field strength between the pair of the magnetic flux collecting rings;

a steering torque computing portion that computes the steering torque of the steering wheel based on the magnetic field strength detected by the first magnetic field detecting element;

a second magnetic field detecting element that is arranged on a non-rotary member, which is not rotated upon rotation of the first rotary member, opposite an outer peripheral surface of the ring magnet and that is adapted to detect a magnetic field strength in three directions including a radial direction of the ring magnet, an axial direction linear to the rotational axis, and a tangential direction vertical to the radial direction and the axial direction;

a slide magnet that is arranged opposite the second magnetic field detecting element in the axial direction;

a slide mechanism that moves the slide magnet in the axial direction according to a rotation of the first rotary member; and a steering angle computing portion that computes a steering angle of the steering wheel based on the magnetic field strength in the three directions detected by the second magnetic field detecting element, the method comprising:

calculating a migration length from a reference position of the slide magnet based on the magnetic field strength in the axial direction detected by the second magnetic field detecting element;

correcting an offset of the magnetic field strength in the radial direction based on the migration length of the slide magnet calculated by the slide magnet distance computing portion; and computing the steering angle of the steering wheel using the corrected magnetic field strength in the radial direction.

Effects of the Invention

According to an embodiment of the invention, a torque steering angle sensor can be provided that has an enhanced detection accuracy, as well as a method for correcting the torque steering angle sensor.

BRIEF DESCRIPTION OF THE DRAWINGS

Next, the present invention will be explained in conjunction with appended drawings, wherein.

DETAILED DESCRIPTION OF THE PREFERRED EMBODIMENTS

Embodiment

Next, an embodiment according to the invention will be described with the accompanying drawings.

(Configuration of the Electric Steering Device)

Figure 1:
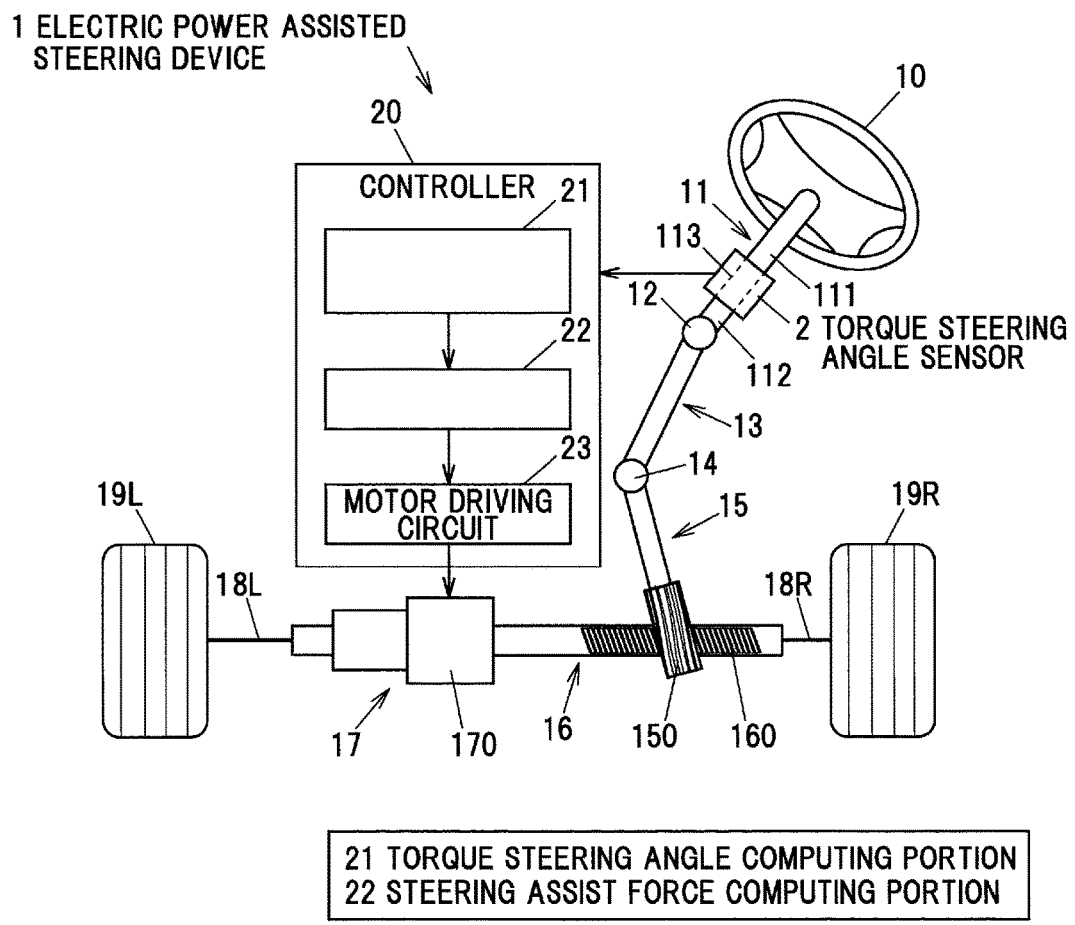
FIG. 1 is a schematic view showing an electric power assisted steering device to which a torque steering angle sensor in an embodiment according to the invention is applied.

FIG. 1 is a schematic view showing an electric power assisted steering device which applies a torque steering angle sensor in an embodiment according to the invention.

The electric power assisted steering device 1 includes a steering shaft 11, which is connected to a steering wheel 10, an intermediate shaft 13, which is connected to the steering shaft 11 via a universal joint 12, a pinion shaft 15, which is connected to the intermediate shaft 13 via a universal joint 14, a rack shaft 16, which is provided with rack teeth 160 which mesh with pinion teeth 150 of the pinion shaft 15, a steering assist mechanism 17 to generate a steering assist force depending on a steering torque applied to the steering shaft 11 in steering of the steering wheel 10, and a torque steering angle sensor 2 to detect a steering angle and a steering torque of the steering wheel 10.

The rack shaft 16 is supported by a rack housing (not shown), and is moved in a vehicle width direction depending on the steering of the steering wheel 10. Turning left and right front wheels 19L and 19R and the rack shaft 16 are connected together by left and right tie rods 18L, and 18R. The rack shaft 16 and the pinion shaft 15 constitute a rack and pinion steering mechanism.

In this embodiment, the steering assist mechanism 17 is of a rack assist type to apply a steering assist force to the rack shaft 16, wherein a turning force of an electric motor 170 is converted by, for example a ball screw mechanism, into a moving force in a linear direction, and is applied to the rack shaft 16 as a steering assist force. It should be noted, however, that the steering assist mechanism 17 may be of a column assist type to be provided in a steering column to support the steering shaft 11, wherein the turning force of the electric motor 170 is decelerated by, for example, a worm gear mechanism, and is applied to the steering shaft 11 as the steering assist force.

The steering assist mechanism 17 is provided with motor current from a controller 20 and produces a steering assist force depending on the motor current. The controller 20 includes a torque steering angle computing portion 21 for computing a steering torque and a steering angle based on an output signal of the torque steering angle sensor 2, which is made of a steering torque computing portion 21a and a steering angle computing portion 21b, a steering assist force computing portion 22 for computing a steering assist force to be applied based on a computed result of the torque steering angle computing portion 21, and a motor driving circuit 23 to output the motor current depending on the steering assist force computed by the steering assist force computing portion 22, and drive the electric motor 170 of the steering assist mechanism 17.

The steering assist force computing portion 22 is configured to perform the computation in such a manner that the greater the steering torque, or the higher the steering speed computed based on a temporal change in the steering angle, the greater the steering assist force applied to the steering mechanism by the steering assist mechanism 17. Meanwhile, the steering angle computed by the torque steering angle computing portion 21 is also used for, for example, controlling in a vehicle anti-skid device (ESC: Electronic Stability Control) and the like.

The steering shaft 11 includes a first rotary member 111 on its steering wheel 10 side, and a second rotary member 112 on its intermediate shaft 13 side, and the first rotary member 111 and the second rotary member 112 are coupled together by a torsion bar described later. The torque steering angle sensor 2 is arranged on a coupling portion for the first rotary member 111 and the second rotary member 112. Note that, in the present embodiment, although the torque steering angle sensor 2 is arranged on the steering shaft 11, the torque steering angle sensor 2 may instead be arranged on the pinion shaft 15, for example.

(Configuration of the Torque Steering Angle Sensor)

Next, a configuration of the torque steering angle sensor 2 will be explained. Note that, in the following description, although for convenience, the steering wheel 10 side in the axial direction of the steering shaft 11 is described as "upper," and its opposite side (the intermediate shaft 13 side) is described as "lower," the "upper" or "lower" is not intended to limit the upper or lower side in a vertical direction when the electric power assisted steering device 1 is used.

Figure 2A:
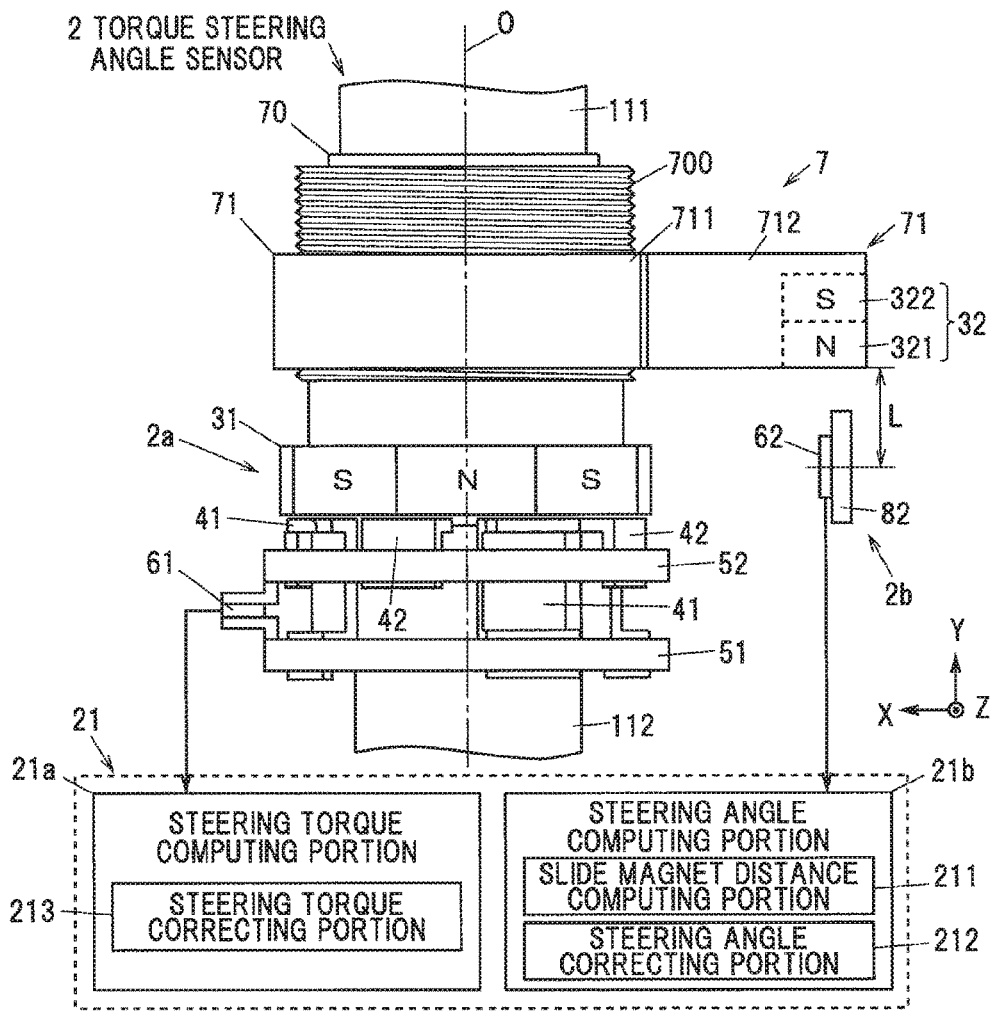
FIG. 2A is a side view showing the torque steering angle sensor.
Figure 2B:
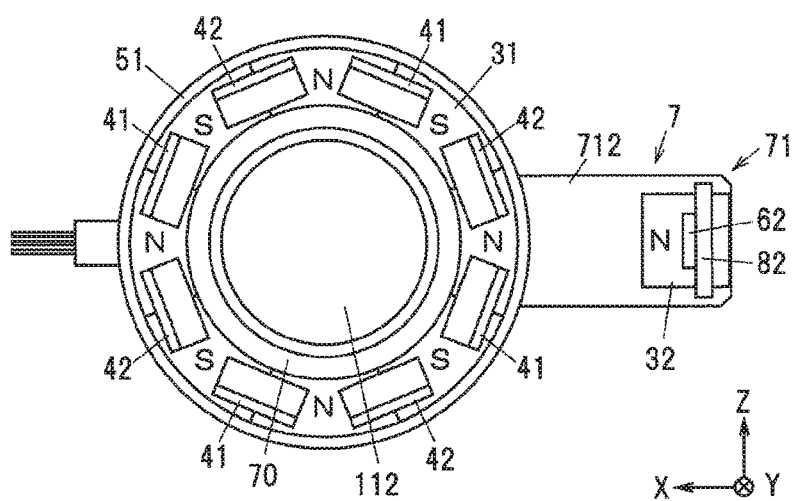
FIG. 2B is a bottom view showing the torque steering angle sensor.

FIG. 2A is a side view showing a torque steering angle sensor. FIG. 2B is a bottom view showing a torque steering angle sensor.

The first rotary member 111 and the second rotary member 112 of the steering shaft 11 share the rotational axis O, and rotate together with the steering wheel 10. The first rotary member 111 and the second rotary member 112 are coupled together by a torsion bar (not shown) having a torsional angle depending on the steering torque of the steering wheel 10. The torsion bar is un-rotatably connected to the first rotary member 111 at one axial end thereof, and is un-rotatably connected to the second rotary member 112 at the other axial end. The torque steering angle sensor 2 is arranged on coupling portion for a connecting the first rotary member 111 and the second rotary member 112.

The torque steering angle sensor 2 includes the torque detecting portion 2a configured to detect a steering torque, and the steering angle detecting portion 2b configured to detect a steering angle, and are received in a column housing (not shown) for tilt adjustably holding the steering shaft 11. The column housing is an example of a "non-rotary member" in the present invention which is not rotated by the rotation of the first rotary member 111.

(Configuration of the Torque Detecting Portion 2a)

Figure 3A:
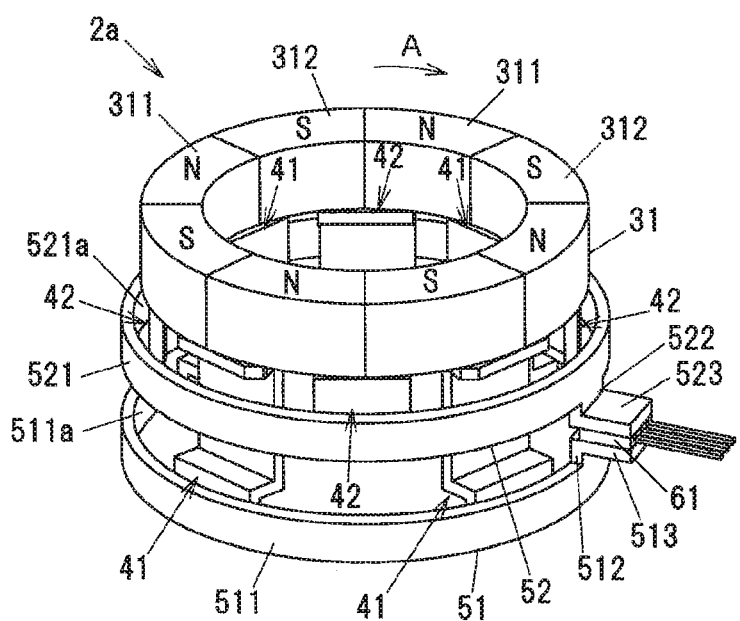
FIG. 3A is a perspective view showing a configuration of a torque detecting portion.
Figure 3B:
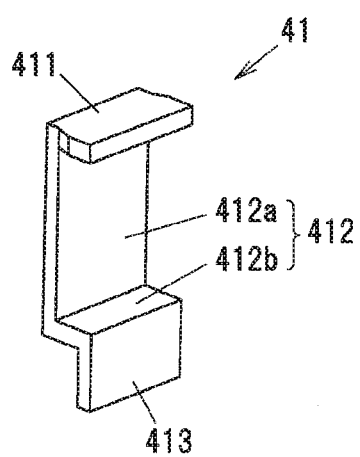
FIG. 3B is a perspective view showing a first magnetic yoke in the toque detecting portion.
Figure 3C:
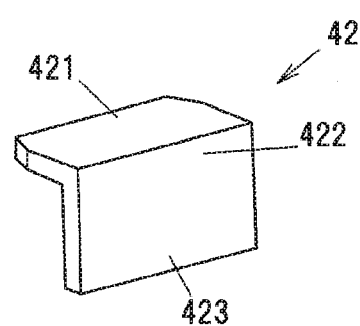
FIG. 3C is a perspective view showing a second magnetic yoke in the torque detecting portion.

FIG. 3A is a perspective view showing a configuration of a torque detecting portion. FIG. 3B is a perspective view showing a first magnetic yoke in a toque detecting portion. FIG. 3C is a perspective view showing a second magnetic yoke in a torque detecting portion.

As shown in FIGS. 2A, 2B, 3A to 3C, the torque detecting portion 2a includes an annular ring magnet 31, which is rotated together with the first rotary member 111, first magnetic yokes (first reluctors) 41 and second magnetic yokes (second reluctors) 42, which are configured as a plurality of magnetic path forming members to form magnetic paths for a magnetic flux of the ring magnet 31, first and second magnetic flux collecting rings 51 and 52 to collect the magnetic flux of the first magnetic yokes 41 and the second magnetic yokes 42, a first magnetic field detecting element 61 to detect a magnetic field strength between the one pair of the magnetic flux collecting rings 51 and 52, and a steering torque computing portion 21a to compute a steering torque of the steering wheel 10 based on the magnetic field strength detected by the first magnetic field detecting element 61.

The ring magnet 31 is provided with a plurality of different magnetic poles having different polarities in a circumferential direction around the rotational axis O. In this embodiment, the ring magnet 31 is provided with the eight magnetic poles composed of four N poles 311 and four S poles 312.

The magnetic flux collecting rings 51 and 52 is located apart from the ring magnet 31 in the axis direction (the rotational axis direction). The magnetic flux collecting rings 51 and 52 includes the first magnetic flux collecting ring 51 and the second magnetic flux collecting ring 52 which is disposed above the first magnetic flux collecting ring 51, and the ring magnet 31 is disposed above the both magnetic flux collecting rings 51, 52. The both magnetic flux collecting rings 51, 52 are arranged separately from the both rotary members 111, 112 so as not to rotate with the rotation of the both rotary members 111, 112 and fixed for the non-rotary member such as the column housing.

The magnetic flux collecting rings 51, 52 includes annular portions 511, 521 which are provided with a circular cylindrical shape whose axial width is larger than its radial thickness, which is disposed coaxially with the ring magnet 31. On the first magnetic flux collecting ring 51, a coupling portion 512 is provided generally so as to be extended upward at an upper end of the annular portion 511, and the opposite portion 513 is provided generally so as to project in an outer of the axial direction from a coupling portion 512. Also, on the second magnetic flux collecting ring 52, a coupling portion 522 is provided generally so as to be extended downward at a lower end of the annular portion 521, and an opposite portion 523 is provided so as to project to an outer of the axial direction from the coupling portion 522. The both opposite portions 513, 523 are provided with opposite by a predetermined interval to the axial direction and the first magnetic field detecting element 61 is arranged on between the both opposite portions 513, 523.

The first magnetic field detecting element 61 is, for example, a hall IC (Integrated Circuit) to detect the magnetic field strength using hall effect. Output signals from the first magnetic field detecting element 61 output to the controller 20 and the steering torque computing portion 21a in the torque steering angle computing portion 21.

The first magnetic yoke 41 and the second magnetic yoke 42 as the magnetic path forming members are held by a holding member (not shown) made of resin etc. and fixed in the second rotary members 112 and provided so as to rotate with the second rotary members 112.

The first magnetic yokes 41 are configured to magnetically couple the ring magnet 31 and the first magnetic flux collecting ring 51 together, while the second magnetic yokes 42 are configured to magnetically couple the ring magnet 31 and the second magnetic flux collecting ring 52 together.

The first magnetic yokes 41 each include a respective opposite piece 411, which is located opposite and parallel to an axial end face of the ring magnet 31, a respective transmitting or receiving portion 413 to transmit or receive the magnetic flux to or from the annular portion 511 of the first magnetic flux collecting ring 51, and a respective transferring portion 412 to transfer the magnetic flux between the respective opposite piece 411 and the respective transmitting or receiving portion 413. The respective transferring portion 412 is composed of an axial transferring portion 412a, which is arranged parallel to the rotational axis O, and a radial transferring portion 412b, which is extended in a radial direction toward the annular portion 511 of the first magnetic flux collecting ring 51 at a lower end of the axial transferring portion 412a. The respective transmitting or receiving portion 413 is formed in a plate shape radially opposite an inner circumferential surface 511a of the annular portion 511 of the first magnetic flux collecting ring 51.

The second magnetic yokes 42 each include a respective opposite piece 421, which is located opposite and parallel to an axial end face of the ring magnet 31, a respective transmitting or receiving portion 423 to transmit or receive the magnetic flux to or from the annular portion 521 of the second magnetic flux collecting ring 52, and a respective transferring portion 422 to transfer the magnetic flux between the respective opposite piece 421 and the respective transmitting or receiving portion 423. The respective transferring portion 422 and the respective transmitting or receiving portion 423 are formed of a single flat plate, and the respective transmitting or receiving portion 423 is located opposite the inner circumferential surface 521a of the annular portion 521 of the second magnetic flux collecting ring 52, while the respective transferring portion 422 is located at the ring magnet 31 side relative to the transmitting or receiving portion 423. In other words, the transmitting or receiving portion 423 is in a plate shape radially opposite an inner circumferential surface 521a of the annular portion 521 of the second magnetic flux collecting ring 52.

When no steering torque is applied to the steering shaft 11, the middle portions of the opposite pieces 411 and 421 of the first and second magnetic yokes 41 and 42 in the circumferential direction of the ring magnet 31 face the boundaries between the N poles 311 and the S poles 321, respectively, of the ring magnet 31. In this state, the magnetic field strength detected by the first magnetic field detecting element 61 is substantially zero.

When a steering torque is applied to the steering shaft 11, a torsion occurs in the torsion bar 113, causing a relative rotation between the ring magnet 31 and the first and second magnetic yokes 41 and 42, and the resulting shift in the locations of the opposite pieces 411 and 421 of the first and second magnetic yokes 41 and 42 in the circumferential direction of the ring magnet 31, relative to the magnetic poles (the N poles 311 and the S poles 312) of the ring magnet 31.

For example, when the ring magnet 31 is rotated through a predetermined angle (for example, 5 degrees) in the direction of arrow A in FIG. 3A relative to the first and second magnetic yokes 41 and 42, of the magnetic poles of the ring magnet 31 axially opposite the opposite pieces 411 of the first magnetic yokes 41, the N poles 311 account for a larger proportion than the S poles 312. Also, of the magnetic poles of the ring magnet 31 axially opposite the opposite pieces 421 of the second magnetic yokes 42, the S poles 312 account for a larger proportion than the N poles 311. This allows a portion of the magnetic flux exiting the N poles 311 to be passed in turn through the first magnetic yokes 41, the first magnetic flux collecting ring 51, the first magnetic field detecting element 61, the second magnetic flux collecting ring 52 and the second magnetic yokes 42, and re-enter the S poles 312.

On the other hand, when the ring magnet 31 is rotated in the opposite direction to the direction of arrow A relative to the first and second magnetic yokes 41 and 42, of the magnetic poles of the ring magnet 31 axially opposite the opposite pieces 411 of the first magnetic yokes 41, the S poles 312 account for a larger proportion than the N poles 311, while of the magnetic poles of the ring magnet 31 axially opposite the opposite pieces 421 of the second magnetic yokes 42, the N poles 311 account for a larger proportion than the S poles 312. This allows the magnetic flux to be passed through the first magnetic field detecting element 61 in the opposite direction to the above described direction.

The magnetic field strength (absolute value) detected by the first magnetic field detecting element 61 becomes higher with increasing torsion of the torsion bar, that is, with a relative angle between the ring magnet 31 and the first and second magnetic yokes 41, 42 larger (it will be called reluctor angle below). In this manner, the reluctor angle varies depending on the torsion of the torsion bar, a positional relation between the magnetic pole 311 and 312 of the first and second magnetic yokes 41 and 42 vary depending on the variation of the reluctor angle, and the magnetic flux transmitted in the first and second magnetic flux collecting ring 51, 52 varies. As a result, the magnetic field strength detected by the first magnetic field detecting element 61 varies and the direction of that magnetic field varies depending on the direction of torsion of the torsion bar 113.

The steering torque computing portion 21a is provided so as to calculate the reluctor angle which is the relative angle between the ring magnet 31 and the magnetic path forming members (the magnetic yokes 41, 42) based on the magnetic field strength detected by the first magnetic field detecting element 61, and compute the steering torque of the steering wheel 10 based on the calculated reluctor angle. In the present embodiment, the steering torque computing portion 21a is configured so as to correct the magnetic field strength detected by the first magnetic field detecting element 61 and compute the steering torque of the steering wheel 10 using the corrected magnetic field strength. This point will be described later.

(Configuration of Steering Angle Detecting Portion 2b)

As shown in FIGS. 2A, 2B, the steering angle detecting portion 2b includes the ring magnet 31, the second magnetic field detecting element 62, which is arranged on and fixed to the second substrate 82, and located in such a manner as to receive a magnetic field from the ring magnet 31, a slide magnet 32 for producing a magnetic field in a different direction from that of the magnetic field of the ring magnet 31 in the second magnetic field detecting element 62, and a sliding mechanism 7 to move the slide magnet 32 toward or apart from the second magnetic field detecting element 62 with the rotation of the first rotary member 111, and the steering angle computing portion 21b which computes the steering angle of the steering wheel 10 based on the magnetic field strength detected by the second magnetic field detecting element 62. Meanwhile, the ring magnet 31 is the constituent element of both the torque detecting portion 2a and the steering angle detecting portion 2b.

The second magnetic field detecting element 62 is arranged opposite an outer circumferential surface of the ring magnet 31 on the non-rotary member which is not rotated by the rotation of the first rotary member 111. A triaxial magnetic field detecting element which can detect the magnetic field strength in three directions which are a radial direction of the magnetic field of the ring magnet 31 (the X direction), an axial direction which is parallel to the rotational axis O (the Y direction) and a tangential direction which is vertical to the radial direction and the axial direction (the Z direction) is applied as the second magnetic field detecting element 62. A distance between the second magnetic field detecting element 62 and the ring magnet 31 (parallel to the radial direction) is, for example, 15 mm.

Then, since the second magnetic field detecting element 62 can detect the magnetic fields in the X direction and the Z direction, the second magnetic field detecting element 62 can detect the directions of the magnetic fields received from the ring magnet 31. Meanwhile, since the second magnetic field detecting element 62 is also able to detect the magnetic field in the Y direction parallel to the rotational axis O, the second magnetic field detecting element 62 can detect the strength of the magnetic field received from the slide magnet 32.

The second magnetic field detecting element 62 is, for example, a hall IC to detect the magnetic field strength using hall effect. Output signals from the second magnetic field detecting element 62 outputs to the controller 20 and the steering torque computing portion 21a in the torque steering angle computing portion 21.

The slide magnet 32 is arranged opposite the second magnetic field detecting element 62 in the axial direction (the Y direction). The slide magnet 32 has its magnetization direction parallel to the rotational axis O, and is provided with different polarities such as its N pole 321 and its S pole 322 parallel to the Y direction. This allows for preventing the slide magnet 32 from producing its magnetic field for the X direction and the Z direction in the second magnetic field detecting element 62.

Also, the slide magnet 32 and the second magnetic field detecting elements 62 are located with the rotational axis O between their and the first magnetic field detecting element 62. This allows for preventing the magnetic field of the slide magnet 32 from affecting results of the magnetic field strength detected by the first magnetic field detecting element 61.

The sliding mechanism 7 is so as to move the slide magnet 32 with the rotation of the first rotary member 111 in the axial direction (the Y direction). The sliding mechanism 7 includes a slider 71, which is configured as a supporting member for supporting the slide magnet 32, a slide driving member 70, which is configured as an annular member to rotate together with the first rotary member 111, and which is provided with a helical meshing portion 700 around an outer circumferential surface in such a manner as to mesh with the slider 71. The sliding mechanism (not shown) may have a guiding member (not shown) so as to guide the slider 71 parallel to the rotational axis O, which is fixed to the column housing 110. The slide driving member 70 and the slider 71 are made of a non-magnetic metal such as aluminum, austenitic stainless steel, or a non-magnetic material such as hard resin.

The slide driving member 70 is formed in a circular cylindrical shape into which the first rotary member 111 is inserted, and is fixed to the first rotary member 111. The slide driving member 70 is fixed to the ring magnet 31 at its lower end by an adhesive, for example. The slide driving member 70 has its smaller outer diameter at its lower end formed than its outer diameter at its meshing portion 700, and is fitted with the ring magnet 31 around its outer circumferential surface at its lower end.

The meshing portion 700 is provided with a single helical groove around its outer circumferential surface of the slide driving member 70. The meshing portion 700 is formed in such a manner as to be able to mesh with the slider 71 and thereby move the slide magnet 32 toward or apart from the second magnetic field detecting element 62, even when the steering wheel 10 is steered at maximum left and right steering angles.

The slider 71 includes a circular ring portion 711 which a slider side meshing portion (not shown) that meshes with the meshing portion 700 of the slide driving member 70 is formed on the inner circumferential surface and a supporting member 712 which supports the slide magnet 32 and is arranged so as to project to the outer of the axial direction from a part of the circumferential direction of the ring portion 711. When the slide driving member 70 is rotated together with the first rotary member 111, with the helical groove 700a and the slider side meshing portion meshing with each other, the slider 71 is moved vertically.

In the steer angle detecting portion 2b, when the slide magnet 32 supported by the slider 71 is moved downward together with the slider 71, the distance between the slide magnet 32 and the second magnetic field detecting element 62 becomes shorter, and the magnetic field strength in the Y direction detected by the second magnetic field detecting element 62 becomes higher. On the other hand, when the slide magnet 32 is moved upward together with the slider 71, the distance between the slide magnet 32 and the second magnetic field detecting element 62 becomes longer, and the magnetic field strength in the Y direction detected by the second magnetic field detecting element 62 becomes lower.

On the other hand, when the second magnetic field detecting element 62 is arranged opposite the outer circumferential surface of the ring magnet 31, when the ring magnet 31 is rotated, the N poles 311 and S poles 312 of the ring magnet 31 alternately face the second magnetic field detecting element 62. As a result, the magnetic field strength in the X direction and the Z direction change periodically. In this case, since four pairs of the N poles 321 and the S poles 322 are arranged in the ring magnet 31, a period of changing the magnetic field strength in the X and the Z direction is 90° (±45°).

Then, the steering angle computing portion 21b calculates a relative rotational angle (it will be called a ring angle below) of the ring magnet 31 in any periodic from the magnetic field strength in the X and the Z direction, and how many times of the periodic change from the reference position (it will be called a rotational period) from the magnetic field strength in the Y direction, which are based on the magnetic field strength detected by the second magnetic field detecting element 62 in three direction. The steering angle computing portion 21b is configured so as to correct the magnetic field strength in the X direction and compute the steering angle based on the corrected magnetic field strength in the X direction. In the present embodiment, the steering angle computing portion 21b corrects the magnetic field strength in the X direction and computes the steering angle based on the corrected magnetic field strength in the X direction. Next this point will be described.

(Explanation of Correcting Steering Angle)

As with described above, the steering angle computing portion 21b calculates a ring angle (a relative rotational angle of the ring magnet in any periodic) from the magnetic field strength in the X direction and the Z direction, and a rotational period (which period of the periodic change from the reference position) from the magnetic field strength in the Y direction.

Specifically, in this case, a magnet which has four pairs of the N pole 311 and the S pole 312 is applied as the ring magnet 31. Since the changing period between the magnetic field strength in the X direction Bx and the magnetic field strength in the Z direction Bz is 90°, a ring angle θrin can be calculated from the following equation (1).

$$\theta rin = \{\arctan(-Bx/Bz)\}/4 \quad (1)$$

Herein, a range of ring angle θrin is from −45° to 45°.

Also, a rotational period n can be calculated by predetermined threshold group for the magnetic field strength in the Y direction By and calculating which threshold range has By. The rotational period n is, for example, integral numbers between −12 to 12 except for zero.

Additionally, a present steering angle θn can be calculated from the calculated ring angle θrin and the rotational period n, in the following equation (2).

$$\theta n = \theta rin + 90 \times (n-1) + 45 \quad (2)$$

By the way, an amplitude of the magnetic field strength in the X direction (the radial direction) Bx and an amplitude of the magnetic field strength in the Z direction (the tangential direction) Bz are equal ideally and an offset (a difference of value between the center of the amplitude and the magnetic flux density zero point) is also 0. In this case when the graph charts of which a vertical axis shows the measured rotational angle and a horizontal axis shows the actual rotational angle is made, the graph charts shows a straight line.

Figure 4A:
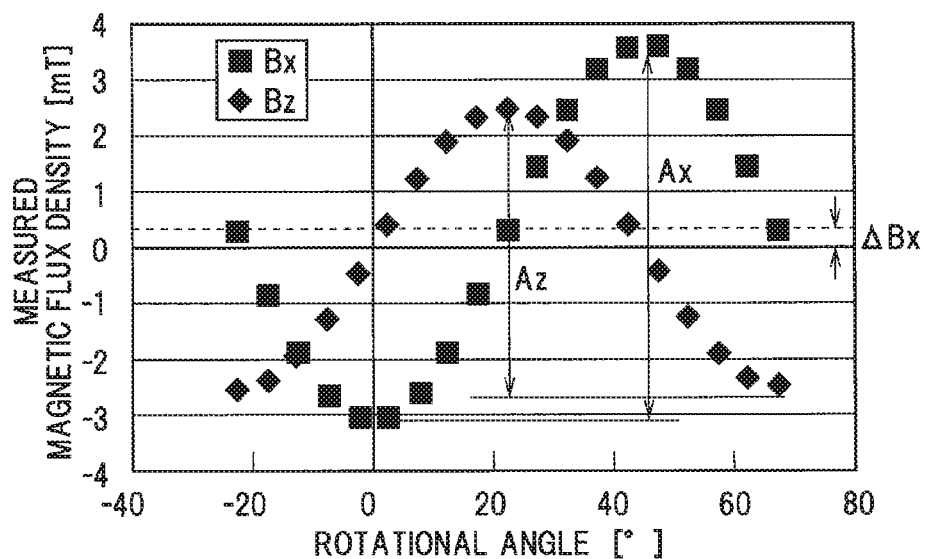
FIG. 4A is graph charts showing an example of a magnetic field strength in a radial direction Bx and a magnetic field strength detection element in tangential direction, detected in a second magnetic field detecting element.

However, as shown in FIG. 4A, as the magnetic field strength in the X direction (the radial direction) Bx and the magnetic field strength in the Z direction (the tangential direction) Bz are measured actually, a Bx amplitude Ax and a Bz amplitude Az has difference in an amplitude value and an offset ΔBx is generated in the Bx. Meanwhile, the rotational angle of the horizontal angle in FIG. 4A shows the ring angle θrin.

Figure 4B:
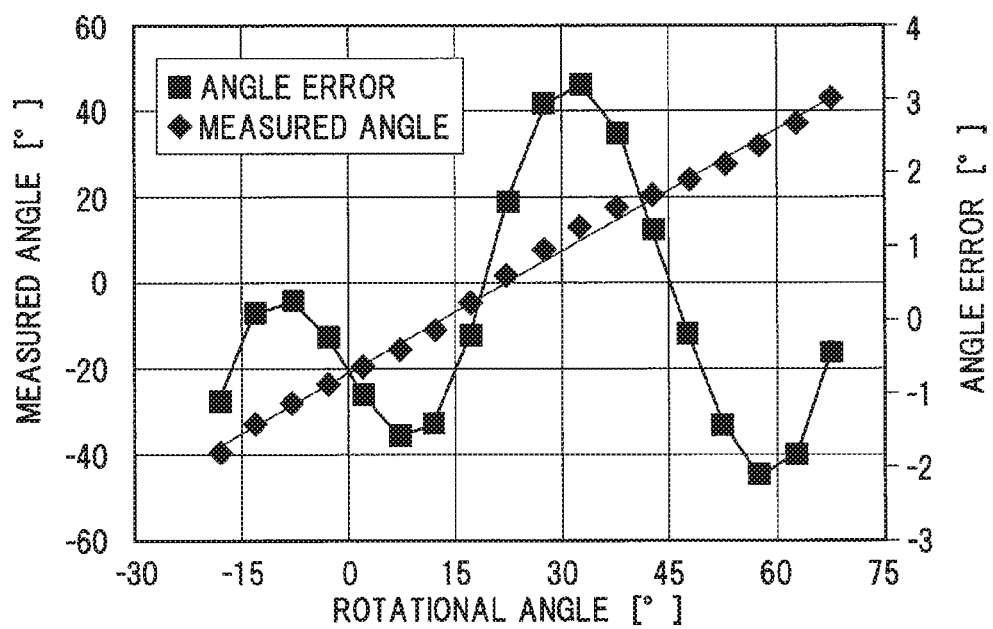
FIG. 4B is graph charts showing a relation between an actual rotational angle, and a measured rotational angle and an angle error.

Since an amplitude difference between the Bx and the Bz is generated and the offset ΔBx is generated in Bx, the graph charts which shows the measured rotational angle (the measured angle in the vertical axis, the ring angle computed by the equation described above (1)) as a function of the actual rotational angle (the rotational angle in the horizontal axis, the actually ring angle) is distorted to the straight line and a straight error arises. Meanwhile, an angle error shown in FIG. 4B shows the error between the actual rotational angle and the measured rotational angle.

When the present inventors made examinations about the cause of generation of these amplitude difference and the cause of generation of the offset, the inventors found that the amplitude difference and the value of the offset increase and decrease by affected from an interference factor which has no relation to the steering angle measuring, stickily, the slide magnet 32 and the magnetic yokes 41, 42 (the magnetic material such as permalloy material).

Figure 5:
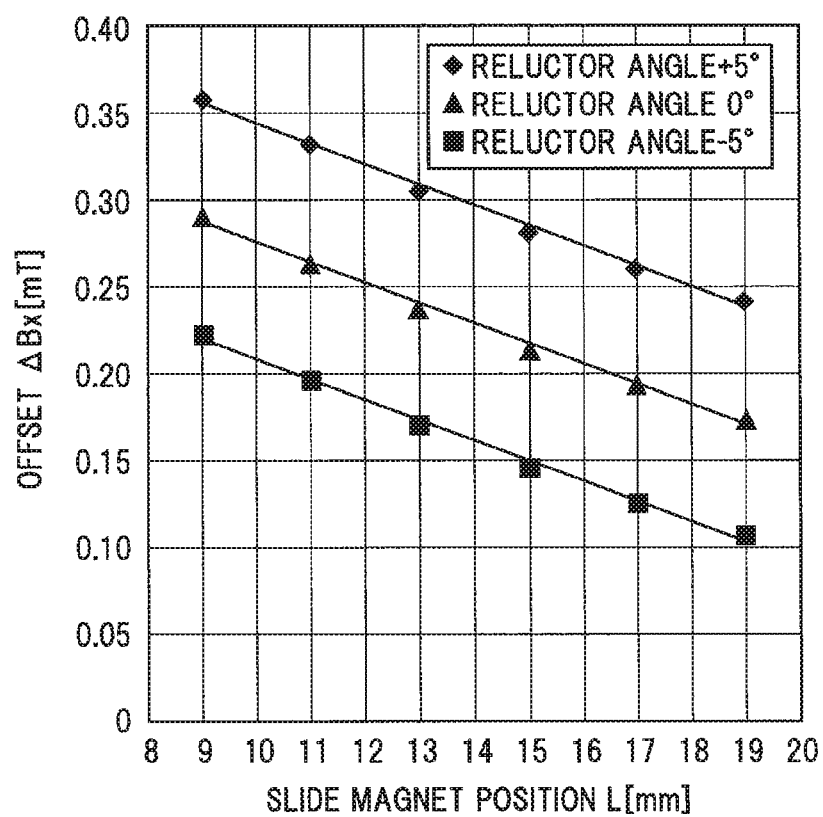
FIG. 5 is graph charts showing a relation between an offset occurs in a difference of magnetic field strength in a radial direction and a position of a slide magnet by a reluctor angle.

First, we consider the offset ΔBx generated in the magnetic field strength in the X direction (the radial direction) Bx. FIG. 5 shows functional relationship between a location of the slide magnet 32 and the reluctor angle, and the offset ΔBx.

FIG. 5 shows that the offset ΔBx generated in the magnetic field strength in the X direction (the radial direction) Bx changes straightly depending on the position of the slide magnet 32, that is, a distance L between the slide magnet 32 and the second magnetic field detecting element 62. Meanwhile, the distance L is, as shown in FIG. 2A, the distance from the bottom end surface of the slide magnet 32 to the center of the second magnetic field detecting element 62 in the axial direction (the Y direction).

Thus the magnetic field generated by the slide magnet 32 changes an offset volume of the magnetic field strength in the X direction (the radial direction) Bx and an amount of the change is mostly proportional to a migration length of the slide magnet 32. Accordingly, although the slide magnet 32 is located any position, the offset volume of the Bx can be prevented minimally and decrease the straight error in the measured angle in the offset by mathematizing previously by measuring a relationship between the position of the slide magnet 32 and the offset ΔBx and changing an offset correcting volume depending on the migration length of the slide magnet 32.

Also, it is found that the offset ΔBx which is generated in the magnetic field strength in the X direction (the radial direction) Bx changes by the reluctor angle which is the relative angle between the ring magnet 31 and the first and second magnetic yokes 41, 42.

Accordingly, the offset ΔBx generated in the magnetic field strength in the X direction (the radial direction) Bx can be shown by a following equation (3) if the migration length from the reference position of the slide magnet 32 is ΔL, the reluctor angle is θrel, $$\Delta Bx = a \cdot \Delta L + f(\theta rel) \quad (3)$$

The "a" in the equation (3) is a coefficient which shows the effect for the offset ΔBx by the slide magnet 32 and is a constant value. Also, f(θrel) is a function which shows the effect of the offset ΔBx by the reluctor angle θrel and sets previously by experimenting.

By subtracting the amount of the offset ΔBx from the magnetic field strength in the X direction (the radial direction) Bx detected from the second magnetic field detecting element 62, the offset can be cancelled and become almost zero.

That is, in the present embodiment, the steering angle computing portion 21b includes a slide magnet distance computing portion 211 which calculates the migration length from the reference position of the slide magnet 32 ΔL based on the magnetic field strength in the axial direction (the Y direction) By and a steering angle correcting portion 212 which corrects the magnetic field strength in the radial direction (the X direction) Bx based on the migration length ΔL of the slide magnet 32 calculated in the slide magnet distance computing portion 211 and the reluctor angle θrel (the relation angle between the ring magnet 31 and the magnetic path forming members (the magnetic yokes 41,42)), and is configured so as to compute the steering angle θn of the steering wheel 10 using the magnetic field strength in the rotational axis (the X direction) Bx which is corrected in the steering angle correcting portion 212.

The steering angle correcting portion 212 is configured so as to offset correct by calculating the offset ΔBx from the equation described above (3) and subtracting the calculated offset ΔBx from the magnetic field strength in the X direction (the radial direction) Bx detected in the second magnetic field detecting element 62.

Figure 6A:
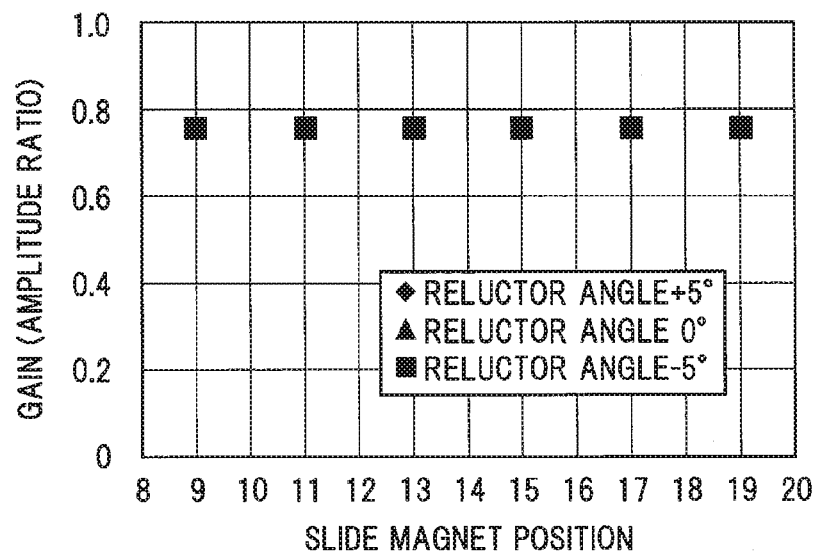
FIG. 6A is graph charts showing a relation between an amplitude ration of magnetic field strength in a radial direction and in a tangential direction, and a position of a slide magnet by a reluctor angle.
Figure 6B:
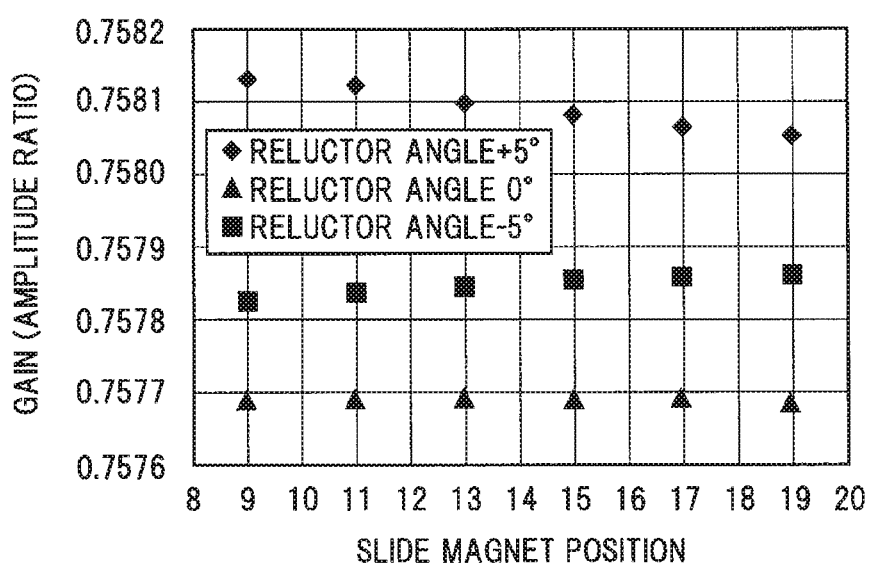
FIG. 6B is graph charts showing a relation between an amplitude ration of magnetic field strength in a radial direction and in a tangential direction, and a position of a slide magnet by a reluctor angle.

Next, an amplitude difference between the Bx and the Bz will be considered. FIGS. 6A, 6B show functional relationship between a position of the slide magnet 32 and an amplitude ratio between the Bx and the Bz (Az/Ax) by the reluctor angle θrel. Meanwhile, FIG. 6B is the graph charts that the vertical axis in FIG. 6A is enlarged.

As shown in FIGS. 6A, 6B, the amplitude ratio between the Bx and the Bz (Az/Ax) is a mostly fixed value (in this case, about 0.758) regardless of the position of the slide magnet 32 or the reluctor angle θrel. As shown in FIG. 6B, although the amplitude ratio between the Bx and the Bz (Az/Ax) changes strictly by the position of the slide magnet 32 or the reluctor angle θrel, a rate of change is about 0.06% and it is infinitesimal.

Meanwhile, the amplitude difference between the Bx and the Bz is considered to change by mostly the distance between the ring magnet 31 and the second magnetic field detecting element 62. In the torque steering angle sensor 2, since the distance between the ring magnet 31 and the second magnetic field detecting element 62 is fixed, the amplitude ratio between the Bx and the Bz can be 1 by calculating previously the amplitude ratio (Az/Ax) as a correction coefficient from the measurements and multiplying the value of the measured Bx and the correction coefficient.

So, in the present embodiment, the steering angle correcting portion 212 corrects amplitude by multiplying the magnetic field strength in the radial direction (the X direction) Bx detected by the second magnetic field detecting element 62 and the correction coefficient which is predetermined (in this case, 0.758).

In this manner, in the present embodiment, the steering angle correcting portion 212 corrects the offset correcting and the amplitude correcting for the magnetic field strength in the radial direction (the X direction) Bx. The corrected magnetic field strength in the radial direction (the X direction) Bxd can be shown in the equation described below (4) if the correction coefficient of the amplitude correcting is A, $$Bxd = A \times Bx - \Delta Bx \quad (4)$$

The steering angle computing portion 21b is configured so as to calculate the ring angle θrin using the equation described below (5) using the corrected magnetic field strength in the radial direction (the X direction) Bxd and calculate the current steering angle θn from the equation (2) described above.

$$\theta rin = \{\arctan(-Bxd/Bz)\}/4 \quad (5)$$

Figure 7A:
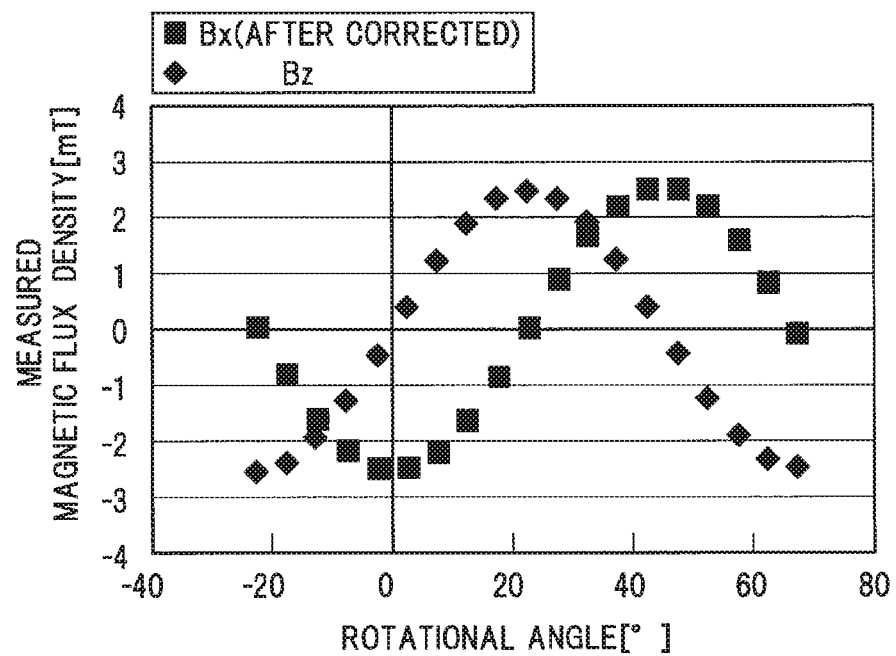
FIG. 7A is graph charts showing a magnetic field strength in a radial direction after correcting and a magnetic field strength in a tangential direction after correcting.
Figure 7B:
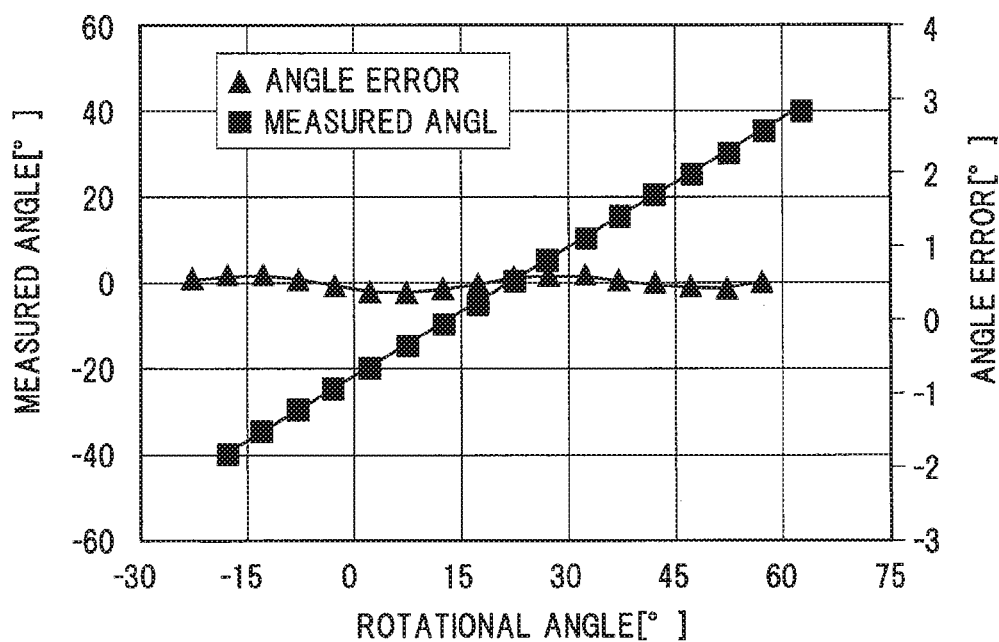
FIG. 7B is graph charts showing a relation between a measured rotational angle that is calculated using a corrected magnetic field strength in a radial direction and an actual rotational angle.

FIG. 7A shows the corrected magnetic field strength in the X direction (the radial direction) Bxd and the magnetic field strength in the Z direction (the tangential direction) together. FIG. 7B shows a functional relationship between the measured rotational angle calculated by using the corrected magnetic field strength in the X direction (the radial direction) Bxd (the measured angle in the vertical axis, the ring angle calculated by the equation (5) described above) and the actual rotational angle (the rotational angle in the horizontal axis, the actual ring angle).

As shown in FIG. 7B, after the magnetic field strength in the X direction (the radial direction) is corrected, the relationship between the measured rotational angle and the actual rotational angle is nearly straight. It shows that the straight error is reduced and the ring angle θrin can be calculated accurately, that is, the steering angle θn can be calculated accurately.

Meanwhile, the detail will be described later, although the reluctor angle θrel used in the equation (3) describe above is computed in the steering torque computing portion 21 based on the magnetic field strength detected the first magnetic field detecting element 61 in the torque detecting portion 2a, it is known that surrounding members (Specifically, the rotational angle of the ring magnet (the ring angle θrin)) affect the magnetic field strength detected by the first magnetic field detecting element 61. Accordingly, the equation (3) described above can be applied only when the effect from the surrounding members is prevented satisfyingly by shielding the first magnetic field detecting element 61 satisfyingly etc. and the magnetic field strength detected by the first magnetic field detecting element 61 is not needed to correct.

As with the present embodiment, the first magnetic field detecting element 61 is not shielded etc. and if the magnetic field strength detected by the first magnetic field detecting element 61 needs to correct, the steering angle correcting portion 212 should be configured so as to calculate the offset ΔBx by the equation (6) described below.

$$\Delta Bx = a \cdot \Delta L \quad (6)$$

Meanwhile if the steering angle correcting portion 212 is configured so as to calculate the offset ΔBx using the equation (6) described above without corrected by the reluctor angle θrel, an error of the offset ΔBx can be small satisfyingly. Specifically, it is normal that an objective error of the ring angle θrin is about ±1.5°, even without corrected by the reluctor angle θrel (that is, even the offset ΔBx is calculated by the equation (6) described above), the objective error can be small by about 0.086°.

(Explanation of the Steering Torque Correcting)

The steering torque computing portion 21a calculates the reluctor angle θrel which is a relative angle between the ring magnet 31 and the magnetic path forming members (the magnetic yokes 41, 42) based on the magnetic field strength detected by the first magnetic field detecting element 61 (an amount of the change of the magnetic field strength). Since the reluctor angle θrel is equal to the torsional angle of the torsion bar, the steering torque can be calculated from the relationship between the known value of the torque and the torsional angle of the torsion bar.

The magnetic flux outputted from the ring magnet 31 reaches for the first magnetic field detecting element 61 through not only the magnetic yokes 41, 42 and the magnetic flux collecting rings 51, 52 but also the air. An error occurs in the reluctor angle θrel and the steering torque fails to be measured stickily caused by the magnetic flux which reaches for the first magnetic field detecting element 61 through the air.

Since the magnetic flux density of the magnetic flux, which reaches for the first magnetic field detecting element 61 from the ring magnet through the air changes depending on the relative angle between the ring magnet 31 and the first magnetic field detecting element 61, the measuring error of the steering torque changes depending on the angle of the ring magnet 31, that is, the ring angle θrin.

Figure 8A:
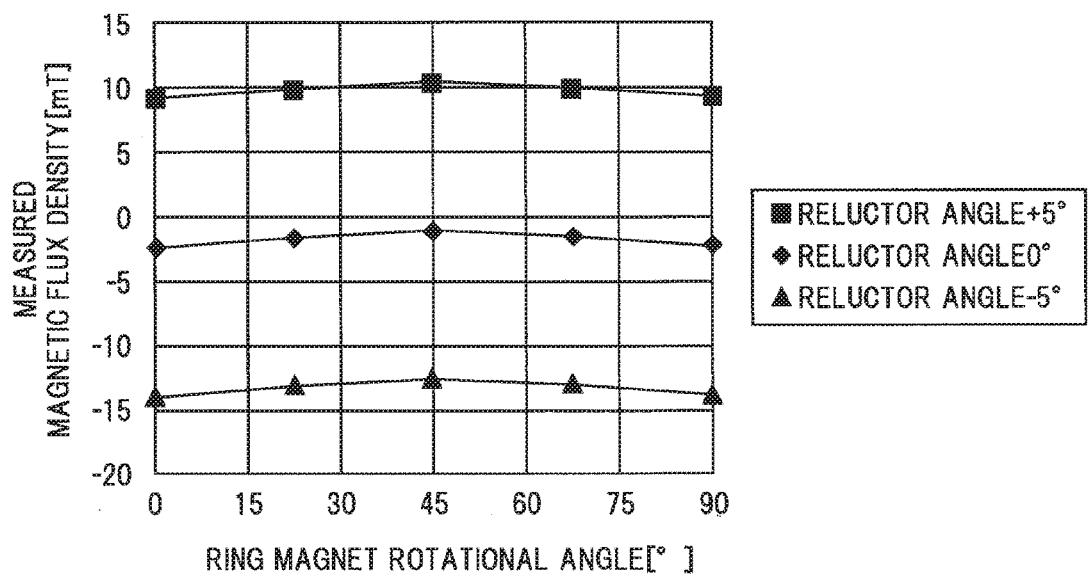
FIG. 8A is graph charts showing a magnetic field strength detected by a first magnetic field detecting element when a ring angle varies by reluctor angles, which is detected in changing a ring angle.

FIG. 8A shows the magnetic field strength (the magnetic flux density) by each reluctor angle θrel detected by the first magnetic field detecting element 61 when the ring angle θrin changes.

As shown in FIG. 8A, the magnetic flux density B detected by the first magnetic field detecting element 61 is affected by not only the reluctor angle θrel but also the ring angle θrin. When the present inventors made examination, when the value of the reluctor angle θrel is fixed, the magnetic flux density B changes per a constant period cos(4·θrin) for the ring angle θrin. And it can be observed that the magnetic flux density B is defined by the equation (7) described below.

$$B=f(\theta rel)-b\cdot\cos(4\cdot\theta rin) \quad (7)$$

Meanwhile, f(θrel) in the equation (7) is a function which the reluctor angle θrel is a parameter which is predetermined depending on a experiments etc. Also "b" in the equation (7) is a coefficient and, in this case, b is about 0.65.

According to the equation (7), to remove the effect depending on the ring angle θrin, it can be observed to calculate a corrected value f2 (θrin) which is shown in the equation (8) described below.

$$f2(\theta rin)=-b\cdot\cos(4\cdot\theta rin) \quad (8)$$

And subtract the corrected value f2 (θrin) from the magnetic flux density B detected by the first magnetic field detecting element 61.

That is, in the present embodiment, the steering torque computing portion 21a is provided with the steering torque correcting portion 213 to correct the magnetic field strength B detected by the first magnetic field detecting element 62, based on the ring angle θrin which is the rotational angle of the ring magnet, and configured so as to compute the steering torque of the steering wheel 10 using the magnetic field strength Bd which the steering torque correcting portion 213 corrects.

The steering torque correcting portion 213 is configured so as to correct by calculating the corrected value f2 (θrin) from the equation (8) described above and subtracting the corrected value f2 (θrin) from the magnetic flux density B detected by the first magnetic field detecting element 61. When the corrected value f2 (θrin) is calculated, the ring angle θrin which is calculated in the steering angle computing portion 21b in the steering angle detecting portion 2b is used. However, it is preferable to use the ring angle θrin which is calculated in the equation (5) described above using the corrected magnetic field strength in the radial direction (the X direction) Bxd.

Figure 8B:
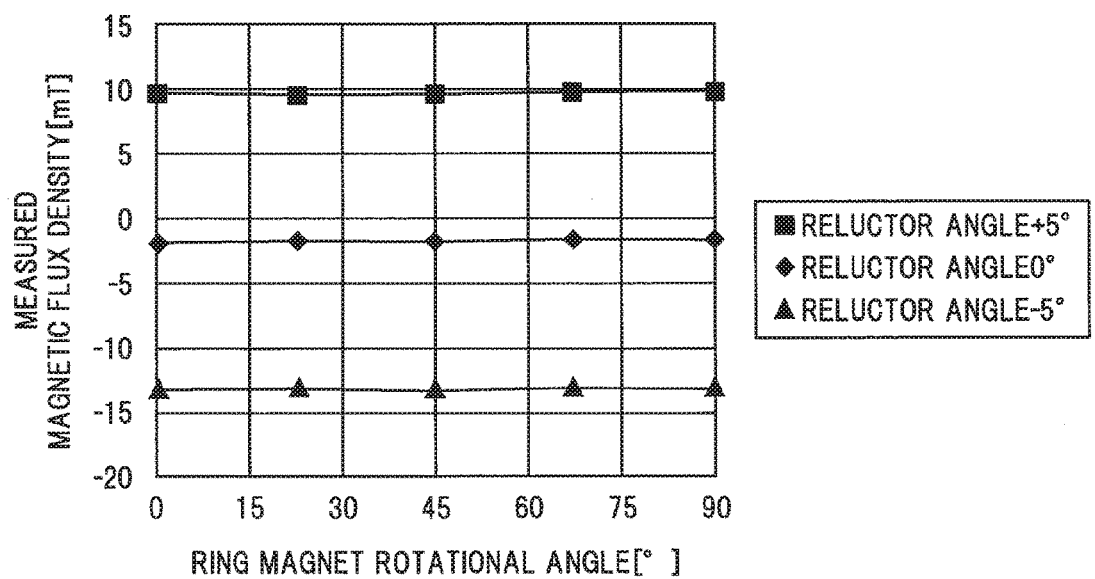
FIG. 8B is graph charts showing a corrected magnetic field strength after correcting by reluctor angles, when a ring angle varies.

FIG. 8B shows the corrected magnetic field strength Bd when the ring angle θrin changes by every reluctor angle θrel.

As shown in FIG. 8B, the corrected magnetic field strength Bd is a mostly fixed value regardless of the ring angle θrin. The error of the magnetic field strength B before correcting when the reluctor angle θrel is fixed is not more than 1.30 mT. The error is not more than 0.56° by converting into the reluctor angle θrel. However, the error of the magnetic field strength B can be reduced by not more than 0.18 mT which is converted into the reluctor angle θrel 0.057° when the reluctor angle θrel is fixed using the corrected magnetic field strength Bd. Even the objective error of the reluctor angle θrel should be normally about 0.08, it can be observed that the value of the error is in the objective error satisfyingly by correcting.

(Explanation of the Control Process of the Torque Steering Sensor 2)

Next, It will be explained about the control process of the torque steering angle sensor 2 using FIG. 9.

Figure 9:
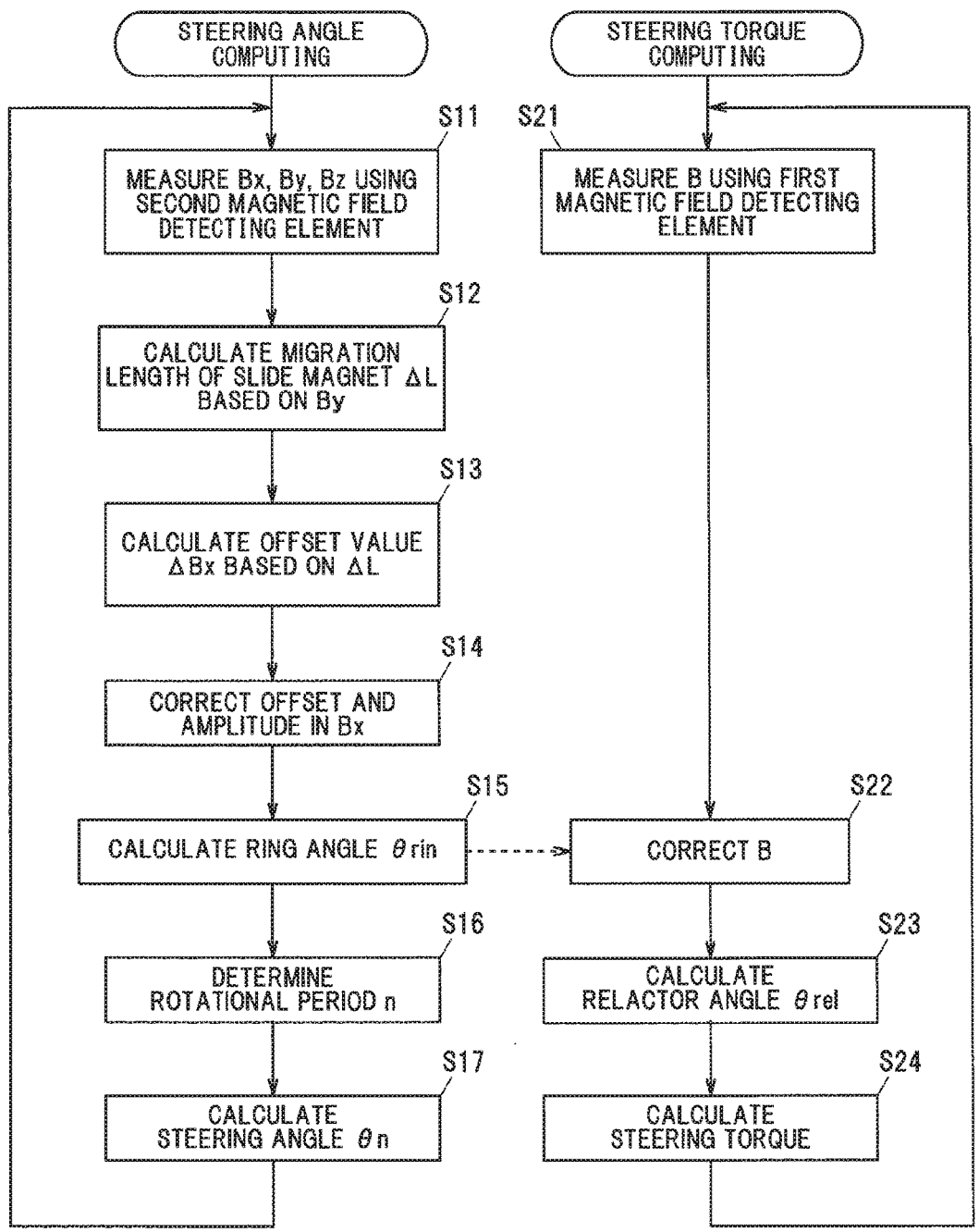
FIG. 9 is flowcharts showing a control flow of a torque steering angle sensor.

As shown in FIG. 9, the steering angle sensor 2 is configured so as to compute the steering angle and the steering torque in parallel with each other. Meanwhile, it is not limited to that and the steering angle sensor 2 may be configured so as to compute the steering angle and the steering torque sequentially.

In the steering angle operating, first, the second magnetic field detecting element 62 measures the magnetic field strength in the radial direction (the X direction) Bx, the magnetic field strength in the axial direction (the Y direction) By, and the magnetic field strength in the tangential direction (the Z direction) Bz in the step S11.

Then, the slide magnet distance computing portion 211 computes the migration length ΔL from the reference position of the slide magnet 32 based on the magnetic field strength in the axial direction (the Y direction) By in the step S12.

Then, the steering angle correcting portion 212 computes the offset ΔBx using the equation (6) described above in the step S13, and corrects the magnetic field strength in the radial direction (the X direction) Bx in the step S14.

Then, the steering angle computing portion 21b calculates the ring angle θrin using the equation (5) described above in the step S15, and calculates the rotational period n by comparing with the calculated magnetic field strength in the axial direction (the Y direction) By and the predetermined threshold group in the step S16. Then the steering angle computing portion 21b calculates the steering angle θn from the equation (2) described above based on the calculated ring angle θrin and the rotational period n in the step S17. Then the control process goes back to the step S11.

In the steering torque computing, first, the first magnetic field detecting element 61 measures the magnetic field strength B in the step S21.

Then the steering torque computing portion 21a waits until the ring angle θrin is calculated, and calculates the corrected value f2 (θrin) from the equation (8) described above based on the ring angle θrin which is computed in the steering angle computing step S15, and corrects the magnetic field strength B by subtracting the corrected value f2 (θrin) from the magnetic field strength B detected by the first magnetic field detecting element 61 in the step S22.

Then the steering torque computing portion 21a calculates the reluctor angle θrel using the corrected magnetic field strength Bd in the step S23, and calculate the steering torque using the relationship between the know-torque value and the torsional angle of the torsion bar in the step S24. Then the control process goes back to the step S21.

(Functions and Effects of the Embodiment)

As described above, in the torque steering angle sensor 2 according to the present embodiment, the steering angle computing portion 21b is provided with the slide magnet distance computing portion 211 to calculate the migration length ΔL from the reference position of the slide magnet 32 based on the magnetic field strength in the axial direction (the Y direction) By detected by the second magnetic field detecting element 62, and the steering angle correcting portion 212 to correct offset for the magnetic field strength in the radial direction (the X direction) Bx based on the migration length ΔL which the slide magnet distance computing portion 211 calculates. The torque steering angle sensor 2 is configured so as to compute the steering angle θn in the steering wheel 10 using the magnetic field strength in the radial direction (the X direction) Bxd corrected by the steering angle correcting portion 212.

Due to the above configuration, the offset ΔBx in the magnetic field strength in the radial direction (the X direction) Bx reduces, the effect of the offset ΔBx is prevented, and the steering angle θn can be calculated accurately.

Moreover, in the present embodiment, since the steering angle correcting portion 212 is configured so as to correct the amplitude by multiplying the magnetic field strength in the radial direction (the X direction) Bx detected by the second magnetic field detecting element 62 and the predetermined correction coefficient, the amplitude of the Bx is uniform with the amplitude of the Bz, the effect caused by the amplitude difference between the Bx and the Bz is prevented, and the steering angle θn can be calculated more accurately.

Also, in the present embodiment, since the steering torque computing portion 21*a* is provided with the steering torque correcting portion 213 which corrects the magnetic field strength B detected by the first magnetic field detecting element 61 based on the rotational angle of the ring magnet 31 (the ring angle θrin) and configured so as to compute the steering torque of the steering wheel 10 using the corrected magnetic field strength Bd which the steering torque correcting portion 213 corrects, in additional to the steering angle θn, the steering torque can be calculated accurately.

In this way, the torque steering angle sensor 2 can detect accurately the steering angle θn and steering torque even the surrounding members affects. Accordingly, even the shielding member etc. is not arranged to the magnetic field detecting elements 61, 62 (or only arrange the minimum required shielding member), the torque steering angle sensor 2 can detect accurately the steering angle θn and the steering torque and it can be minimalized by reducing parts count and reduce production cost.

SUMMARY OF THE EMBODIMENTS

Next, technical ideas understood from the embodiments as described above will be described below with using the reference numerals, etc., used in the description of the embodiments. However each reference numeral, etc., described below is not intended to limit the constituent elements in the claims to the members, etc., specifically described in the embodiments.

[1] A torque steering angle sensor (2), which is arranged at a coupling portion between a first rotary member (111) and a second rotary member (112) coupled by a torsion bar generating a torsional angle according to a steering torque of a steering wheel (10) so as to detect a steering angle and a steering torque of the steering wheel (10) comprising:

a circular ring magnet (31) that a plurality of different magnetic poles (311, 312) having different polarities are formed along a circumferential direction around a rotational axis of the first rotary member (111) and the second rotary member (112), and that is rotated together with the first rotary member (111);

a plurality of magnetic path forming members (41, 42) that are arranged so as to be rotated together with the second rotary member (112), and that are configured so as to allow a relative angle to the ring magnet (31) to vary according to a torsion of the torsion bar and allow a transmitted magnetic flux to vary along with a change in a positional relation with the magnetic poles (311, 312) according to the varied relative angle;

a pair of magnetic flux collecting rings (51, 52) that collect a magnetic flux in the plurality of magnetic path forming members (41, 42);

a first magnetic field detecting element (61) that is adapted to detect a magnetic field strength between the pair of the magnetic flux collecting rings (51, 52);

a steering torque computing portion (21*a*) that computes a steering torque of the steering wheel (10) based on the magnetic field strength detected by the first magnetic field detecting element (61);

a second magnetic field detecting element (62) that is arranged on a non-rotary member, which is not rotated upon rotation of the first rotary member (111), opposite an outer peripheral surface of the ring magnet (31) and that is adapted to detect a magnetic field strength in three directions including a radial direction of the ring magnet (31), an axial direction linear to the rotational axis, and a tangential direction vertical to the radial direction and the axial direction;

a slide magnet (32) that is arranged opposite the second magnetic field detecting element (62) in the axial direction;

a slide mechanism (7) that moves the slide magnet (32) in the axial direction according to a rotation of the first rotary member (111); and a steering angle computing portion (21*b*) that computes a steering angle of the steering wheel (10) based on the magnetic field strength in the three directions detected by the second magnetic field detecting element (62):

wherein the steering angle computing portion (21*b*) comprises a slide magnet distance computing portion (211) that calculates a migration length from a reference position of the slide magnet (32) based on the magnetic field strength in the axial direction detected by the second magnetic field detecting element (62), and a steering angle correcting portion (212) that corrects an offset of the magnetic field strength in the radial direction based on the migration length of the slide magnet (32) calculated by the slide magnet distance computing portion (211), and wherein the steering angle computing portion (21*b*) computes the steering angle of the steering wheel (10) using a magnetic field strength in the radial direction corrected by the steering angle correcting portion (212).

[2] The torque steering angle sensor (2) according to [1], wherein the steering angle correcting portion (212) is configured so as to correct amplitude by multiplying the magnetic field strength in the radial direction detected by the second magnetic field detecting element (62) by a predetermined correction coefficient.

[3] The torque steering angle sensor (2) according to [1] or [2], wherein the steering angle computing portion (21*b*) is configured so as to calculate a rotational angle of the ring magnet (31) using the magnetic field strength in the radial direction corrected by the steering angle correcting portion (212), and to compute the steering angle of the steering wheel (10) based on the rotational angle of the ring magnet (31), and wherein the steering torque computing portion (21*b*) further comprises a steering torque correcting portion (213) that corrects the magnetic field strength detected by the first magnetic field detecting element (61) based on the rotational angle of the ring magnet (31), and is configured so as to compute the steering torque of the steering wheel (10) using the magnetic field strength corrected by the steering torque correcting portion (213).

[4] The torque steering angle sensor (2) according to [1] or [2], wherein the steering torque computing portion (21a) is configured so as to calculate the relative angle between the ring magnet (31) and the magnetic path forming members (41, 42) based on the magnetic field strength detected by the first magnetic field detecting element (61), and to compute the steering torque of the steering wheel (10) based on the relative angle, and wherein the steering angle correcting portion (212) is configured so as to correct the offset of the magnetic field strength in the radial direction based on a distance between the second magnetic field detecting element (62) and the slide magnet (32) and the relative angle between the ring magnet (31) and the magnetic path forming members (41, 42) calculated by the steering torque computing portion (21a).

[5] A method for correcting a torque steering angle sensor (2), wherein the torque steering angle sensor (2) is arranged at a coupling portion between a first rotary member (111) and a second rotary member (112) coupled by a torsion bar generating a torsional angle according to a steering torque of a steering wheel (10) so as to detect a steering angle and a steering torque of the steering wheel (10), and wherein the torque steering angle sensor (2) comprises:

a circular ring magnet (31) that a plurality of different magnetic poles (311, 312) having different polarities are formed along a circumferential direction around a rotational axis of the first rotary member (111) and the second rotary member (112), and that is rotated together with the first rotary member (111);

a plurality of magnetic path forming members (41, 42) that are arranged so as to be rotated together with the second rotary member (112), and that are configured so as to allow a relative angle between the ring magnet (31) to vary according to a torsion of the torsion bar and allow a transmitted magnetic flux to vary along with a change in a positional relation with the magnetic poles (311, 312) according to the varied relative angle;

a pair of magnetic flux collecting rings (51, 52) that collect a magnetic flux in the plurality of magnetic path forming members (41, 42);

a first magnetic field detecting element (61) that is adapted to detect a magnetic field strength between the pair of the magnetic flux collecting rings (51, 52);

a steering torque computing portion (21a) that computes a steering torque of the steering wheel (10) based on the magnetic field strength detected by the first magnetic field detecting element (61);

a second magnetic field detecting element (62) that is arranged on a non-rotary member, which is not rotated upon rotation of the first rotary member (111), opposite an outer peripheral surface of the ring magnet (31) and that is adapted to detect a magnetic field strength in three directions including a radial direction of the ring magnet (31), an axial direction linear to the rotational axis, and a tangential direction vertical to the radial direction and the axial direction;

a slide magnet (32) that is arranged opposite the second magnetic field detecting element (62) in the axial direction;

a slide mechanism (7) that moves the slide magnet (32) in the axial direction according to a rotation of the first rotary member (111); and a steering angle computing portion (21b) that computes a steering angle of the steering wheel (10) based on the magnetic field strength in the three directions detected by the second magnetic field detecting element (62), the method comprising:

calculating a migration length from a reference position of the slide magnet (32) based on the magnetic field strength in the axial direction detected by the second magnetic field detecting element (62);

correcting an offset of the magnetic field strength in the radial direction based on the migration length of the slide magnet (32) calculated by the slide magnet distance computing portion; and computing the steering angle of the steering wheel (10) using the corrected magnetic field strength in the radial direction.

[6] The method according to [5], further comprising correcting amplitude by multiplying the magnetic field strength in the radial direction detected by the second magnetic field detecting element (62) by a predetermined correction coefficient.

[7] The method according to [5] or [6], wherein the steering angle computing portion (21b) is configured so as to calculate a rotational angle of the ring magnet (31) using the corrected magnetic field strength in the radial direction, and to compute the steering angle of the steering wheel (10) based on the rotational angle of the ring magnet (31), and wherein the magnetic field strength detected by the first magnetic field detecting element (61) is corrected based on the rotational angle of the ring magnet (31), and wherein the steering torque of the steering wheel (10) is calculated using the corrected magnetic field strength.

[8] The method according to [5] or [6], wherein the steering torque computing portion (21a) is configured so as to calculate a relative angle between the ring magnet (31) and the magnetic path forming members (41, 42) based on the magnetic field strength detected by the first magnetic field detecting element (61), and to compute the steering torque of the steering wheel (10) based on the relative angle, and wherein the offset of the magnetic field strength in the radial direction is corrected based on a distance between the second magnetic field detecting element (62) and the slide magnet (32) and the relative angle between the ring magnet (31) and the magnetic path forming members (41. 42) calculated by the steering torque computing portion (21a).

Although the embodiments of the invention have been described, the invention is not to be limited to the embodiments. Meanwhile, it should be noted that all combinations of the features described in the embodiments are not necessary to solve the problem of the invention.

Also, the various kinds of modifications can be implemented without departing from the gist of the invention.

What is claimed is:

1. A torque steering angle sensor, which is arranged at a coupling portion between a first rotary member and a second rotary member coupled by a torsion bar generating a torsional angle according to a steering torque of a steering wheel so as to detect a steering angle and a steering torque of the steering wheel, comprising:

a circular ring magnet including a plurality of different magnetic poles having different polarities formed along a circumferential direction around a rotational axis line of the first rotary member and the second rotary member, and that is rotated together with the first rotary member;

a plurality of magnetic path forming members that are arranged so as to be rotated together with the second rotary member, and that are configured so as to allow a relative angle to the ring magnet to vary according to a torsion of the torsion bar and allow a transmitted magnetic flux to vary along with a change in a positional relation with the magnetic poles according to the varied relative angle;

a pair of magnetic flux collecting rings that collect a magnetic flux in the plurality of magnetic path forming members;

a first magnetic field detecting element that is configured to detect a magnetic field strength between the pair of the magnetic flux collecting rings;

a steering torque computing portion configured to compute the steering torque of the steering wheel based on the magnetic field strength detected by the first magnetic field detecting element;

a second magnetic field detecting element that is arranged on a non-rotary member, which is not rotated upon rotation of the first rotary member, opposite an outer peripheral surface of the ring magnet and that is configured to detect a magnetic field strength in three directions including a radial direction of the ring magnet, an axial direction linear to the rotational axis, and a tangential direction vertical to the radial direction and the axial direction;

a slide magnet that is arranged opposite the second magnetic field detecting element in the axial direction;

a slide mechanism configured to move the slide magnet in the axial direction according to a rotation of the first rotary member; and a steering angle computing portion configured to compute a steering angle of the steering wheel based on the magnetic field strength in the three directions detected by the second magnetic field detecting element, wherein the steering angle computing portion comprises a slide magnet distance computing portion configured to calculate a migration length from a reference position of the slide magnet based on the magnetic field strength in the axial direction detected by the second magnetic field detecting element, and a steering angle correcting portion configured to correct an offset of the magnetic field strength in the radial direction based on the migration length of the slide magnet calculated by the slide magnet distance computing portion, and wherein the steering angle computing portion computes the steering angle of the steering wheel using the magnetic field strength in the radial direction corrected by the steering angle correcting portion.

2. The torque steering angle sensor according to claim 1, wherein the steering angle correcting portion is configured so as to correct amplitude for the magnetic field strength in the radial direction by multiplying the magnetic field strength in the radial direction detected by the second magnetic field detecting element by a predetermined correction coefficient.

3. The torque steering angle sensor according to claim 2, wherein the steering angle computing portion is configured so as to calculate a rotational angle of the ring magnet using the magnetic field strength in the radial direction corrected by the steering angle correcting portion, and to compute the steering angle of the steering wheel based on the rotational angle of the ring magnet, and wherein the steering torque computing portion further comprises a steering torque correcting portion that corrects the magnetic field strength detected by the first magnetic field detecting element based on the rotational angle of the ring magnet, and is configured so as to compute the steering torque of the steering wheel using the magnetic field strength corrected by the steering torque correcting portion.

4. The torque steering angle sensor according to claim 2, wherein the steering torque computing portion is configured so as to calculate the relative angle between the ring magnet and the magnetic path forming members based on the magnetic field strength detected by the first magnetic field detecting element, and to compute the steering torque of the steering wheel based on the relative angle, and wherein the steering angle correcting portion is configured so as to correct the offset of the magnetic field strength in the radial direction based on a distance between the second magnetic field detecting element and the slide magnet and the relative angle between the ring magnet and the magnetic path forming members calculated by the steering torque computing portion.

5. The torque steering angle sensor according to claim 1, wherein the steering angle computing portion is configured so as to calculate a rotational angle of the ring magnet using the magnetic field strength in the radial direction corrected by the steering angle correcting portion, and to compute the steering angle of the steering wheel based on the rotational angle of the ring magnet, and wherein the steering torque computing portion further comprises a steering torque correcting portion configured to correct the magnetic field strength detected by the first magnetic field detecting element based on the rotational angle of the ring magnet, and is configured so as to compute the steering torque of the steering wheel using the magnetic field strength corrected by the steering torque correcting portion.

6. The torque steering angle sensor according to claim 1, wherein the steering torque computing portion is configured so as to calculate the relative angle between the ring magnet and the magnetic path forming members based on the magnetic field strength detected by the first magnetic field detecting element, and to compute the steering torque of the steering wheel based on the relative angle, and wherein the steering angle correcting portion is configured so as to correct the offset of the magnetic field strength in the radial direction based on a distance between the second magnetic field detecting element and the slide magnet and the relative angle between the ring magnet and the magnetic path forming members calculated by the steering torque computing portion.

7. A method for correcting a torque steering angle sensor, wherein the torque steering angle sensor is arranged at a coupling portion between a first rotary member and a second rotary member coupled by a torsion bar generating a torsional angle according to a steering torque of a steering wheel so as to detect a steering angle and a steering torque of the steering wheel, and wherein the torque steering angle sensor comprises:

a circular ring magnet including a plurality of different magnetic poles having different polarities formed along a circumferential direction around a rotational axis line of the first rotary member and the second rotary member, and that is rotated together with the first rotary member;

a plurality of magnetic path forming members that are arranged so as to be rotated together with the second rotary member, and that are configured so as to allow a relative angle to the ring magnet to vary according to a torsion of the torsion bar and allow a transmitted magnetic flux to vary along with a change in a positional relation with the magnetic poles according to the varied relative angle;

a pair of magnetic flux collecting rings that collect a magnetic flux in the plurality of magnetic path forming members;

a first magnetic field detecting element that is configured to detect a magnetic field strength between the pair of the magnetic flux collecting rings;

a steering torque computing portion configured to compute the steering torque of the steering wheel based on the magnetic field strength detected by the first magnetic field detecting element;

a second magnetic field detecting element that is arranged on a non-rotary member, which is not rotated upon rotation of the first rotary member, opposite an outer peripheral surface of the ring magnet and that is configured to detect a magnetic field strength in three directions including a radial direction of the ring magnet, an axial direction linear to the rotational axis, and a tangential direction vertical to the radial direction and the axial direction;

a slide magnet that is arranged opposite the second magnetic field detecting element in the axial direction;

a slide mechanism configured to move the slide magnet in the axial direction according to a rotation of the first rotary member; and a steering angle computing portion configured to compute a steering angle of the steering wheel based on the magnetic field strength in the three directions detected by the second magnetic field detecting element, the method comprising:

a slide magnet distance computing portion calculating a migration length from a reference position of the slide magnet based on the magnetic field strength in the axial direction detected by the second magnetic field detecting element;

correcting an offset of the magnetic field strength in the radial direction based on the migration length of the slide magnet calculated by the slide magnet distance computing portion; and computing the steering angle of the steering wheel using the corrected magnetic field strength in the radial direction.

8. The method according to claim 7, further comprising correcting amplitude for the magnetic field strength in the radial direction by multiplying the magnetic field strength in the radial direction detected by the second magnetic field detecting element by a predetermined correction coefficient.

9. The method according to claim 8, wherein the steering angle computing portion is configured so as to calculate a rotational angle of the ring magnet using the corrected magnetic field strength in the radial direction, and to compute the steering angle of the steering wheel based on the rotational angle of the ring magnet, and wherein the magnetic field strength detected by the first magnetic field detecting element is corrected based on the rotational angle of the ring magnet, and wherein the steering torque of the steering wheel is calculated using the corrected magnetic field strength.

10. The method according to claim 8, wherein the steering torque computing portion is configured so as to calculate the relative angle between the ring magnet and the magnetic path forming members based on the magnetic field strength detected by the first magnetic field detecting element, and to compute the steering torque of the steering wheel based on the relative angle, and wherein the offset of the magnetic field strength in the radial direction is corrected based on a distance between the second magnetic field detecting element and the slide magnet and the relative angle between the ring magnet and the magnetic path forming members calculated by the steering torque computing portion.

11. The method according to claim 7, wherein the steering angle computing portion is configured so as to calculate a rotational angle of the ring magnet using the corrected magnetic field strength in the radial direction, and to compute the steering angle of the steering wheel based on the rotational angle of the ring magnet, and wherein the magnetic field strength detected by the first magnetic field detecting element is corrected based on the rotational angle of the ring magnet, and wherein the steering torque of the steering wheel is calculated using the corrected magnetic field strength.

12. The method according to claim 7, wherein the steering torque computing portion is configured so as to calculate the relative angle between the ring magnet and the magnetic path forming members based on the magnetic field strength detected by the first magnetic field detecting element, and to compute the steering torque of the steering wheel based on the relative angle, and wherein the offset of the magnetic field strength in the radial direction is corrected based on a distance between the second magnetic field detecting element and the slide magnet and the relative angle between the ring magnet and the magnetic path forming members calculated by the steering torque computing portion.

* * * * *